May 8, 1928. 1,669,049

W. GRAMS

CULTIVATOR

Filed Dec. 27, 1924    3 Sheets-Sheet 1

Inventor:
Wilhelm Grams
by Jones Addington Ames Seibold
attys

Witness:
A. A. Brand

May 8, 1928.　　　　　　　　　　　　　　　　1,669,049
W. GRAMS
CULTIVATOR
Filed Dec. 27, 1924　　　3 Sheets-Sheet 2

Inventor:
Wilhelm Grams

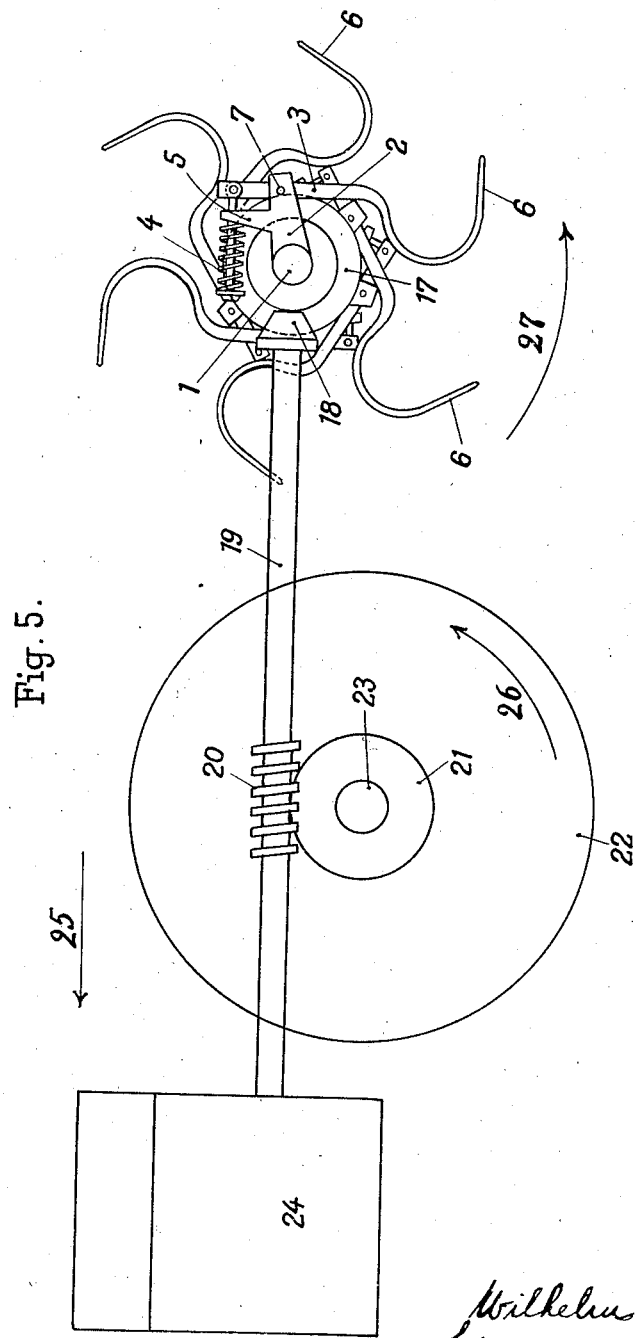

Patented May 8, 1928.

1,669,049

UNITED STATES PATENT OFFICE.

WILHELM GRAMS, OF SYDOWWIESE, GERMANY.

CULTIVATOR.

Application filed December 27, 1924, Serial No. 758,466, and in Germany December 29, 1923.

My invention relates to cultivators, and has particular relation to the provision of means in connection with such apparatus as will insure the proper operation of the same when various obstructions such as stones, etc., are encountered as the tines of the machine move over and through the surface of the ground.

Cultivators are at present used in which the tool shaft, or tine shaft, is provided with crank arms, to the free ends of which latter are rotatably secured rigid tines. When an obstruction is encountered and a predetermined pressure is thereby exceeded at the point of the tine, the cranks yield resiliently about their suspension points and initiate a movement of the obstruction or stone forwardly in the direction that the tines move about their suspension points.

If, however, the obstruction is immovable, there are at present known two methods of protecting the tines against breakage. When the tines are rigid, provision is made for disengaging the operative portion of the tines from the shaft through the operation of an overload clutch. Of course, when the latter method of protecting the tool is used, a mechanical clutch is necessary, and such a device is at times quite unreliable and results in a high percentage of breakage in tines so protected.

If, however, the tine is resiliently supported, or is flexible, it will be drawn over the immovable obstruction by being swung rearwardly. When this latter precautionary operation takes place, the points of the tine usually exert a pressure which is normal to the ground, and it is obvious that the exerting of such a pressure against the stone or obstruction in the direction of the ground, only serves to embed said stone more firmly.

My present invention is, therefore, directed to the elimination of the above disadvantages in providing means which will so operate, upon the tine meeting an obstruction, that not only is the tine itself so moved as to be protected, but at the same time it is actuated to so engage the obstruction that the latter will be moved from its seat and freed from its embedded position. Accordingly, I provide a mechanism whereby the tine, upon meeting an obstruction, is positively drawn toward the pivot point of the tine shaft, this latter being possible through the mounting of the tine and the supporting crank arm as a link mechanism.

As I hereafter point out more in detail in connection with the drawing in my mechanism, the point of the tine, instead of pressing the obstruction downwardly and embedding it more firmly, tends to lift it, and in this manner, overcomes the adhesion between the obstruction and its support. When this latter takes place, and because of the particular point at which the tine engages the obstruction, the latter is moved backwardly to the direction of progression of the apparatus, or, if the stone is too firmly seated in the ground, the tool will be moved thereover without exerting a further downward pressure on the stone.

My invention will be more readily understood when considered in connection with the accompanying drawings, in which:

Fig. 5 is a side, elevational view showing the manner in which the cultivator link mechanism is driven, this view showing the manner moreover in which the tines are arranged.

Figure 1:
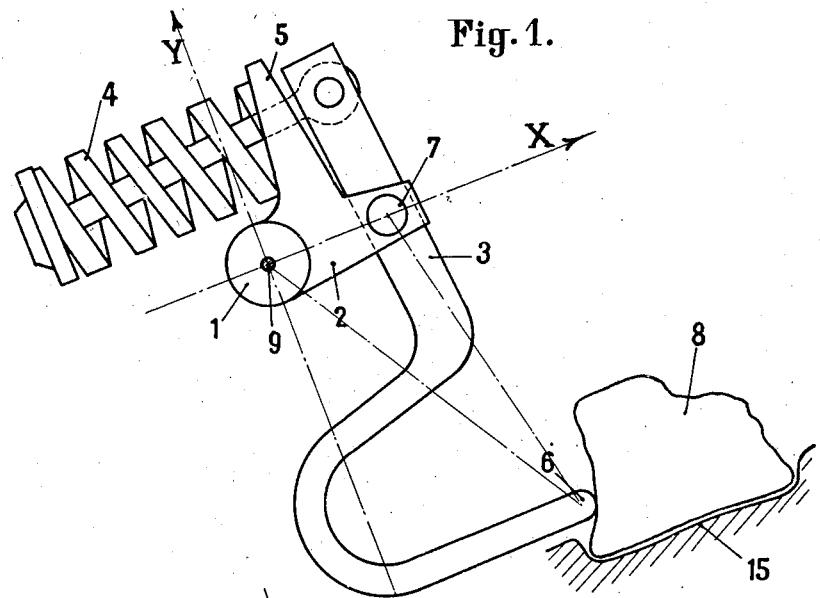
Figure 1 is a side elevational view of so much of the cultivator link mechanism as is necessary to illustrate a complete operative reduction to practice of my invention, and shows the parts in their normal position just as an obstruction is encountered.
Figure 2:
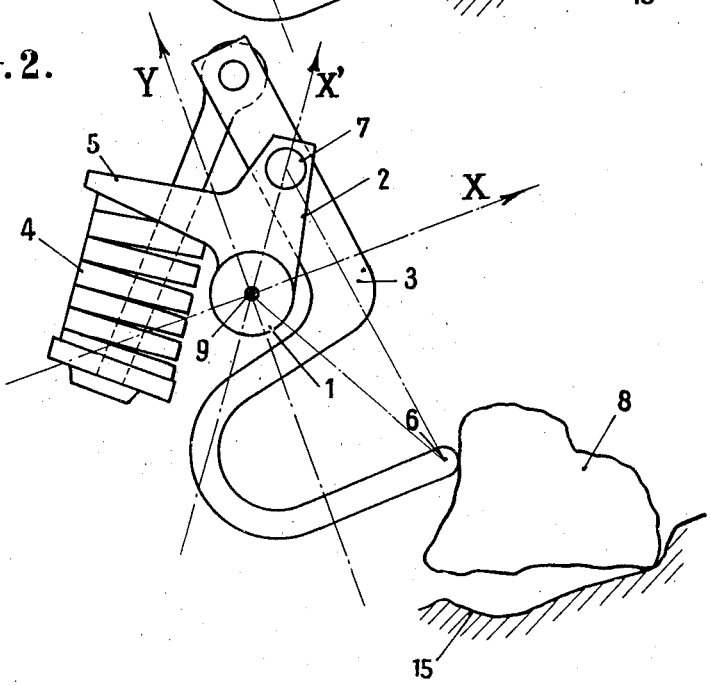
Fig. 2 is a side elevational view of the same parts as shown in Fig. 1, after the improved link mechanism has operated because of the resistance of the obstruction.

Referring now more particularly to the drawings, and to Figs. 1 and 2, a tine shaft 1 has secured thereto a crank arm 2. To the end of the latter, a rigid tine 3 is so secured as to form a link mechanism with the crank 2. The upper free end of the tine 3 bears against the upwardly extending arm 5 of the crank 2, being resiliently movable therefrom by means of the spring 4 so that when an excess pressure is applied at the lower end 6, or point, of the tine, the latter may move about the pivot 7 against the bias of spring 4,—as best shown in Fig. 2.

In other words, as soon as the rotation of the tine shaft 1 is such that the resistance of an obstruction 8 overcomes the spring 4, the parts of my device, which as may be seen, form the arms of a closed link mechanism and so move that the pivot 7 is raised directly upwardly. The crank arm 2 and the tine 3 approach one another closely to accomplish the positive movement of the tine 3, and particularly the point 6 thereof, towards the supporting shaft 1. The crank arm 2, therefore, moves from the axis X in Fig. 1 to the axis X', as shown in Fig. 2. But in both figures it will be observed that the axis Y remains parallel. This upward movement of the tine point 6 releases the obstruction or stone 8 from its support and as the apparatus goes forward, it is obvious that said stone 8 will be rotated out of its bed and probably thereafter easily disposed of.

It is a necessary condition for realizing the above advantageous operation that the crank arm 2 be somewhat shorter than the distance from the pivot 7 to the point 6 of the tine, and that the arms 2 and 3 of the crank mechanism can freely swing towards one another.

Another way of explaining the advantageous results obtained with my invention is to consider that the point of the tine acts with the same angle, in both unloaded and loaded position, on an obstruction to lift the latter. This is shown in Figs. 1 and 2 wherein there are drawn dotted lines from the center of the shaft and from the center or pivotal support of the tine on the shaft to the point 6 of the tine. This showing is made in both Figs. 1 and 2 and it will be seen that the angle between these lines is substantially constant in both normal and loaded position of the tine. In this respect my device differs from those heretofore proposed and with which I am familiar in two vital ways. First, the maintenance of the constant angle, above referred to, allows the the point of my tine to pass over obstructions three times as high as those which may be passed over by prior art devices, this advantage being realized because of the novel manner in which my crank and tine are arranged; and second the devices of the prior art upon meeting obstructions tend to press them more firmly into the ground by reason of the increasingly great angle which the tine assumes after it is progressively obstructed, and since this function is accumulative, the stone is either pressed into the ground sufficiently to allow the tine to pass over it, or the tine is broken by the undue pressure. My device, on the other hand, because of the above indicated maintenance of constant angle presses into the obstruction and lifts it from its anchorage.

The above operation may be better understood from a consideration of the angle lines in Figs. 1 and 2; however, it has also been demonstrated in actual practice that the above advantages are resident in my device as compared with those prior art mechanisms with which I am familiar.

For safety devices in cultivators of the above character, there may be a disadvantage in the formation of the torsional spring if the latter is distorted or abnormally sprung when radial pulls from the point of the tine act on the longitudinal axis of the spring. This follows because such springs are usually adapted for purely torsional purposes, the steel from which they are composed being more readily strained within the compressed fibres than in the parts thereof which are subject to tension. If, therefore, the compression fibres are subject to tension by the above noted radial stresses, the spring will break. According to my invention, therefore, I may so arrange my apparatus that the spiral spring is subjected to purely torsional stresses only, the latter strains being absorbed by a link which connects the free end of the tine, at the center of rotation of the torsional spring, to a lever arm on the tine shaft in the manner, for instance, of the two crank arms.

Figure 4:
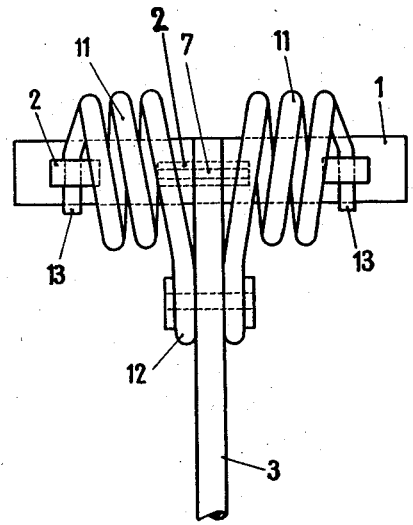
Fig. 4 is a plan view of the mechanism shown in Fig. 3.
Figure 3:
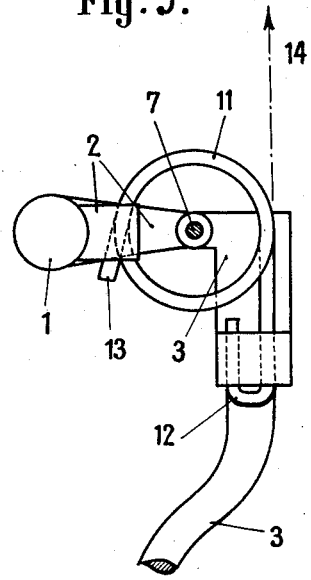
Fig. 3 is a side elevational view comprising a modified form of my invention.

A device of this character is illustrated in Figs. 3 and 4, Fig. 3 being a side elevation in the direction of the longitudinal axis of the torsional spring, while Fig. 4 shows the same arrangement in front elevation. In the latter modified form of my invention, the tine shaft 1, and crank arm 2, form the arms of a link about the pivot 7, which latter is disposed at the center of rotation of a torsional spring 11. This last mentioned spring is of spiral form and is divided into two parts; one of the ends 12—12 of each part being connected to the tine 3, as shown, while the other ends 13—13,—that is the outer ends of the parts,—are connected to the crank arm 2. The spring 11, therefore, tends to hold the crank arms 2 and 3 in their normal, or separated position (it being remembered that 3 represents the upper portion of the tine), until an obstruction is encountered and such resistance opposes the link, whereupon the arms fold about pivot 7. When the latter occurs, the ends 12 and 13 of the spring approach one another by describing a circle around pivot 7. They can not, however, act other than torsionally, or depart radially from the circle because the pivot 7 absorbs the radial strains, and does not yield when the point 6 strikes against a stone 8 and tends to rise in the direction 14.

Reference should be had to Figure 5 which illustrates the manner in which the afore-described mechanism is driven. In this figure the intermeshing bevelled gears 17 and 18 are secured to the shaft 1 and a main driving shaft 19 respectively. On the shaft 19 is a worm 20 engaging with a gear wheel 21, which latter is fixed to and propels the vehicle wheels 22, said vehicle wheels being positioned on a shaft 23. A diagrammatic showing of any desired electric driving device 24 is indicated as furnishing the power to the shaft 19. The vehicle as a whole travels in the direction of the arrow 25, the wheels 22 in the direction indicated by the arrow 26, and the cultivator tines 6 in the opposite direction, or as indicated by the arrow 27.

While I have described but two embodiments of my invention, it is obvious that many modifications therein may occur to those skilled in the art, and I desire, therefore, that my invention be limited only by the showing of the prior art, or by the scope of the appended claims.

Having described my invention, what I claim as new and desire to secure by Letters Patent of the United States, is:

1. A rotary cultivator comprising a shaft, a plurality of tines, a link parallelogram mounting for securing the tines to the cultivator shaft, said latter mechanism operating to raise said tines upwardly and to effect a positive withdrawal of the tines when an obstruction is met.

2. A rotary cultivator comprising a shaft, a crank arm mounted on said shaft and a tine secured to said crank so that the angle formed by two lines,—one drawn from the center of the shaft to the tine point, and the other drawn from the connection point between said tine and crank to the tine point,—remains substantially constant, irrespective of the load on said tine.

3. A rotary cultivator comprising a shaft, a crank member comprising two arms secured to said shaft and a tine secured to said arms of the crank to form a link parallelogram.

4. A rotary cultivator comprising a shaft, a crank member comprising two arms secured to said shaft, a tine mounted on one of said arms, and a means further securing said tine to the other arm to form a parallelogram link mechanism.

5. A rotary cultivator comprising a shaft, a crank member comprising two arms secured to said shaft, a tine pivotally mounted at the end of one of said arms, and means for further securing said tine to the other arm to form a parallelogram link mechanism, the latter being resiliently mounted so that when said tine meets an obstruction the parts of said link swing to raise said tine upwardly towards said shaft.

6. A rotary cultivator comprising a shaft, a crank member comprising two arms secured to said shaft, a tine pivotally mounted at one end of said arms and intermediate the ends of said tine, a further connection between the upper end of said tine and the other arm of said crank member, said latter connection permitting the swinging of said tine around said pivoted connection when the lower portion of the tine meets an obstruction.

7. A rotary cultivator comprising a shaft, a crank member comprising two arms secured to said shaft, a tine pivotally mounted on one end of said arms intermediate the ends of said tine, a further connection between the upper end of said tine and the other arm of said crank member, said latter connection being resilient and permitting the swinging of said tine around said pivoted connection when the lower portion of the tine meets an obstruction, and said arms and tine forming a parallelogram link whereby, when the lower end of said tine meets an obstruction, said resilient connection permits the swinging of said link members to lift said tine upwardly.

8. A rotary cultivator comprising a shaft, a crank member secured to said shaft, and a tine pivotally mounted at the outer end of said crank member and adapted to normally be positioned substantially at right angles to said member, and means for permitting said tine to approach said member by being swung around its connection point therewith, when an obstruction is encountered, the angle formed by the line drawn from the tine point to the center of the shaft and to the mounting point of the tine remaining substantially constant, irrespective of the load on said tine.

9. A rotary cultivator comprising a shaft, a crank member secured to said shaft, and a tine pivotally mounted at the outer end of said crank member and adapted to normally be positioned substantially at right angles to said crank member, and means for permitting said tine to approach said member by being swung around its connection point therewith when an obstruction is encountered, the distance between the point at which said crank member is secured to the tine and the point at which said crank is secured to said shaft being less than the distance between said pivotal connection point of the tine and crank member and the point of said tine, the angle, between the lines drawn from said tine point to the center of said shaft and the mounting point of said tine, remaining substantially constant irrespective of the load on said tine.

10. A rotary cultivator comprising a shaft, a pivotally mounted tine, and means permitting upward movement of said tine when an obstruction is encountered and causing the angle formed by lines from the tine point to the shaft center and the pivotal mounting to said tine to remain substantially constant irrespective of the load on said tine point.

In testimony whereof I have affixed my signature.

WILHELM GRAMS.